(12) United States Patent
Cohen et al.

(10) Patent No.: US 8,645,332 B1
(45) Date of Patent: Feb. 4, 2014

(54) SYSTEMS AND METHODS FOR CAPTURING DATA REFINEMENT ACTIONS BASED ON VISUALIZED SEARCH OF INFORMATION

(75) Inventors: Ronen Cohen, Gesher Haziv (IL); Nimrod Vishnia-Shabtai, Kfar Havradim (IL)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 13/589,414

(22) Filed: Aug. 20, 2012

(51) Int. Cl.
*G06F 17/30* (2006.01)

(52) U.S. Cl.
USPC ....................................................... 707/691

(58) Field of Classification Search
USPC ............ 707/1, 610, 691; 709/204–206; 713/1
See application file for complete search history.

(56) References Cited

U.S. PATENT DOCUMENTS

| | | | |
|---|---|---|---|
| 5,664,109 A | 9/1997 | Johnson et al. | |
| 6,532,480 B1 | 3/2003 | Boothby | |
| 6,704,747 B1 | 3/2004 | Fong | |
| 6,721,751 B1 | 4/2004 | Furusho | |
| 7,013,315 B1 | 3/2006 | Boothby | |
| 7,310,646 B2 | 12/2007 | Rangadass et al. | |
| 7,685,412 B1 * | 3/2010 | Burdick et al. | 713/1 |
| 7,739,309 B2 | 6/2010 | Singh et al. | |
| 7,865,461 B1 * | 1/2011 | Best et al. | 707/610 |
| 2002/0186254 A1 | 12/2002 | Monbaron | |
| 2003/0046280 A1 | 3/2003 | Rotter et al. | |
| 2004/0015783 A1 | 1/2004 | Lennon et al. | |
| 2004/0107189 A1 | 6/2004 | Burdick et al. | |
| 2004/0107203 A1 | 6/2004 | Burdick et al. | |
| 2004/0220955 A1 | 11/2004 | McKee | |
| 2006/0100912 A1 | 5/2006 | Kumar et al. | |
| 2006/0100919 A1 | 5/2006 | Levine | |
| 2006/0106832 A1 | 5/2006 | Ben-Dyke et al. | |
| 2006/0270419 A1 | 11/2006 | Crowley et al. | |
| 2007/0185826 A1 * | 8/2007 | Brice et al. | 707/1 |
| 2008/0016074 A1 | 1/2008 | Ben-dyke et al. | |
| 2008/0046462 A1 | 2/2008 | Kaufman et al. | |
| 2008/0059412 A1 | 3/2008 | Tarin | |
| 2008/0275916 A1 | 11/2008 | Bohannon | |
| 2008/0307255 A1 | 12/2008 | Chen et al. | |
| 2008/0319983 A1 | 12/2008 | Meadows | |

(Continued)

OTHER PUBLICATIONS

"Non-Final Office Action" mailed Mar. 9, 2012, for U.S. Appl. No. 12/883,562, entitled "Systems and Methods for Master Data Management Using Record and Field Based Rules", filed Sep. 16, 2010, 19pgs.

(Continued)

*Primary Examiner* — Etienne Leroux
(74) *Attorney, Agent, or Firm* — Buckley, Maschoff & Talwalkar LLC (57) ABSTRACT

A method for refining data discrepancies in data loads from multiple data stores includes receiving a data set containing data records from one or more data sources, comparing the received data set with a prior data set to identify delta records among corresponding records of the received and the prior data sets, recalculating a best record for data located in each of the corresponding delta records, and if a discrepancy exists in a data value for corresponding delta records, executing a refinement action rule. The refinement action rule includes at least one replace statement and search criteria. The method also includes capturing a user's interaction with a user interface presenting the data set, and storing the interaction in a data store as a refinement action rule. A system for implementing the method and a computer readable medium are also described.

17 Claims, 8 Drawing Sheets

(56) References Cited

U.S. PATENT DOCUMENTS

| | | |
|---|---|---|
| 2009/0024589 A1 | 1/2009 | Sood et al. |
| 2009/0164491 A1 | 6/2009 | Cotichini et al. |
| 2009/0234826 A1 | 9/2009 | Bidlack |
| 2010/0257092 A1 | 10/2010 | Einhorn |
| 2010/0274829 A1 | 10/2010 | Greer |
| 2012/0072464 A1 | 3/2012 | Cohen |

OTHER PUBLICATIONS

"Non-Final Office Action" mailed Aug. 1, 2012, for U.S. Appl. No. 12/883,562, entitled "Systems and Methods for Master Data Management Using Record and Field Based Rules", filed Sep. 16, 2010, 17pgs.

* cited by examiner

| REFINE DATA | | |
|---|---|---|
| YOU HAVE SELECTED 1 RECORD FOR DATA REFINEMENT. ENTER A NEW VALUE TO REPLACE THE EXISTING VALUE AND THEN EXECUTE THE REFINEMENT ACTION. | | |
| APPLIED FILTERS | | |
| BUSINESS PARTNER CATEG | PERSON | |
| GENDER | MALE | |
| REFINEMENT VALUES | | |
| REPLACING VALUE FOR FIELD: PERSON FORM OF ADDRESS | | |
| FROM | MISS; | |
| TO | MR. | |
| DESCRIPTION | | |

400

420

430

OK  CANCEL

SYSTEMS AND METHODS FOR CAPTURING DATA REFINEMENT ACTIONS BASED ON VISUALIZED SEARCH OF INFORMATION

BACKGROUND

A business or enterprise may store information about various items in the form of electronic records. For example, a company might have an employee database where each row in the database represents a record containing information about a particular employee (e.g., the employee's name, date of hire, and salary). Moreover, different electronic records may actually be related to a single item. For example, a human resources database and a sales representative database might both contain records about the same employee. In some cases, it may be desirable to consolidate multiple records to create a single data store that contains a single electronic record for each item represented in the database. Such a goal might be associated with, for example, a master data management program.

Currently, the consolidation process in a master data management program is a manual, time consuming, and error prone operation. For example, a person might manually review records of different data stores looking for potential duplicates. When a potential duplicate is found, he or she might investigate to determine the best way for the information to be combined. Such an approach, however, may even be impractical when a substantial number of records and/or data stores are involved.

Despite the significant advances in enterprise data management and analytics Data consolidation remains time-consuming to inspect and cleans a data set that contains massive amounts of customer information, and bring the data into a state that is usable for analysis. To improve data quality, data stewards must also identify and address issues such as unresolved duplicates, misspellings, missing data, data discrepancies, format inconsistency, and violations of business rules that define quality from an organization subjective perspective.

Extract-transform-load (ETL) processing cannot always address data quality issues automatically. ETL cannot handle unpredictable data issues, since it is deterministic in nature and ETL is not a tool for the business data end-user. Detection and refinement of data is complementary to the ETL processing, and should include handling data quality issues that cannot be handled automatically. For example, data discrepancies could require visual inspection and manual correction.

DETAILED DESCRIPTION

In accordance with embodiments, systems and methods provide user interfaces (UI) and heuristic algorithms that assist a data steward to resolve discrepancies and duplicates that might exist in high-volume information from multiple data sources. Results of a user's (e.g., data steward) interactions with data discrepancies and/or duplications can be retained by the system for later use when the same, or similar, data quality issues occur during a subsequent load of data from the data sources to a master data management (MDM) hub.

During data consolidation of a data set, a data steward detects and refines data after the best record is computed by the system. This detection and refinement occurs prior to the data being released for consumption by analytic business intelligence (BI) tools—e.g., data extractors, report generators, business process modelers, etc. In accordance with an embodiment, an interactive user interface monitors the data steward's actions and provides dialog boxes for the data steward to enter corrections and/or refinements to the data.

The UI, with the aid of statistical methods and visual displays, identifies quality issues in a subsequent data set load which were not anticipated and/or automatically addressed during the subsequent data set's ETL processing. These detection and refinement actions are applied to best records. Application to the best records can avoid losing work, if the user is refining staging records that might not find their way into the best record.

Figure 1:
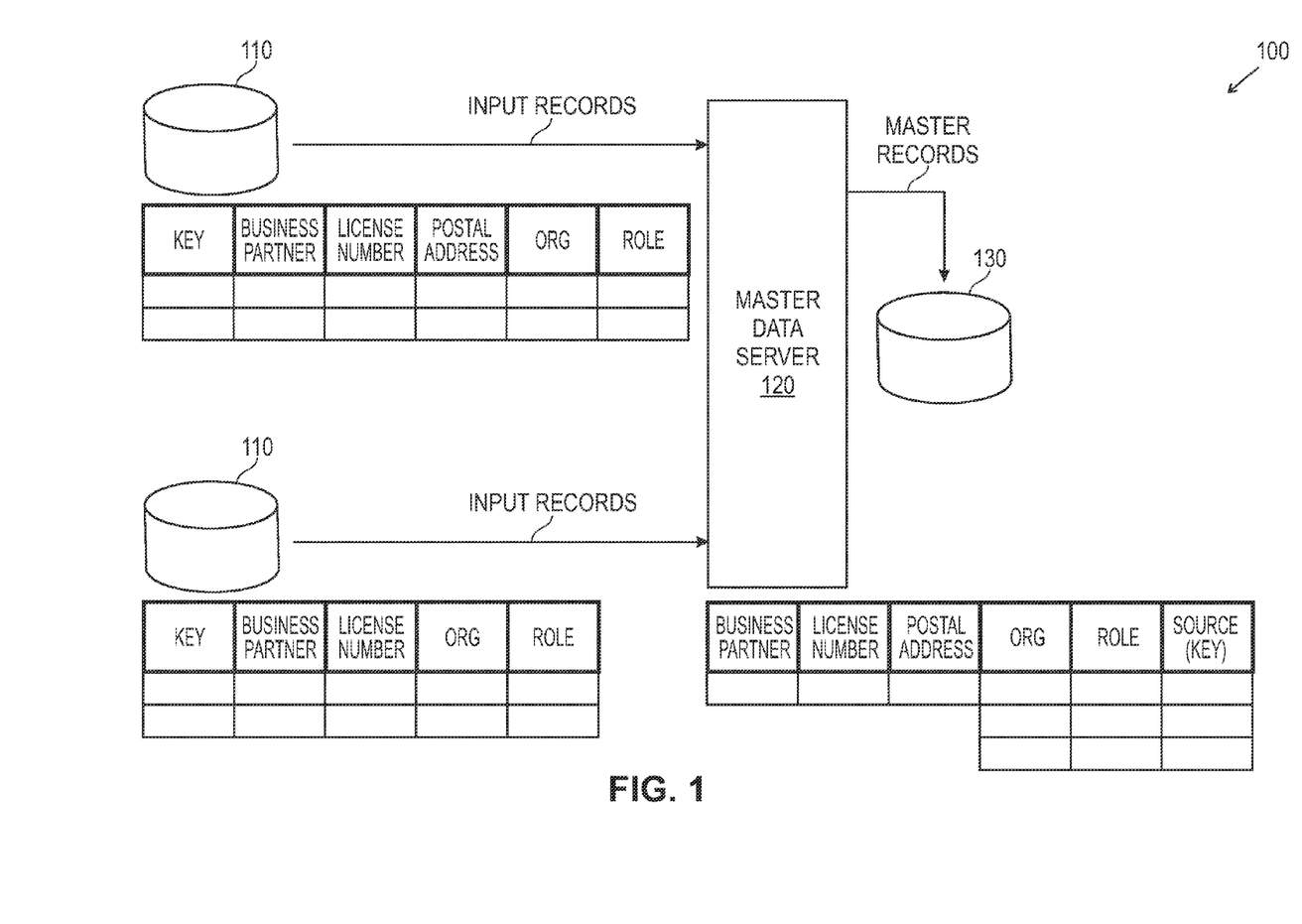
FIG. 1 depicts a system in accordance with some embodiments.

FIG. 1 depicts system 100 for implementing master data management in accordance with an embodiment. System 100 includes a number of data sources 110 storing records, each record containing a number of fields (e.g., a key number, business partner name, license number, and postal address). Different data sources may, for example, be associated with different business applications, including legacy applications. According to some embodiments, one or more data sources might be associated with an Enterprise Resource Planning ("ERP") system.

Note that these records might be stored within physical tables of a database. The database may comprise a relational database such as SAP MaxDB, Oracle, Microsoft SQL Server, IBM DB2, Teradata, etc. As another example, data sources 110 might be associated with a multi-dimensional database, an eXtendable Markup Language ("XML") document, or any other structured data storage system. The physical tables may be distributed among several relational databases, dimensional databases, and/or other data sources.

A master data server 120 may receive input records from the various data sources 110. For example, the master data server 120 might import the input records from a remote data source 110 via HyperText Transport Protocol ("HTTP") communication or any other type of data exchange. The master data server can communicate with the data sources across an electronic communication network, or a dedicated communication path. Master data server 120 and/or data sources 110 might be associated with, for example, personal computers (PC), servers, workstations, tablet computers, netbooks, thin clients, and/or mobile devices.

Master data server 120 may consolidate and/or merge the input records received from data sources 110 and store master records into a master database 130 in accordance with any of the embodiments described herein. For example, a human resources database and a sales representative database might both contain records about the same employee. In this case, the master data server might automatically consolidate the multiple records to create a single master record for that employee. Such a goal might be associated with, for example, a master data management program.

According to some embodiments, a consolidation of records in master data management is associated with a two phase process of (i) identifying potential duplicates and then (ii) merging the records into a single best record representing instance of the record. Note that large sets of data might be extracted from multiple legacy systems into master data server 120 and include some obvious, straight forward duplicates that need to (and can be) resolved and merged immediately after the data is imported into the master data server 120. In many cases, the duplicate detection will be straight forward, such as when it is based on a well defined identifier that can't be interpreted in ambiguous ways—for example, a Social Security Number to identify individuals, or a Global Trade Item Number ("GTIN") to detect duplicate materials.

The master data server can consolidate and/or merge conflicting information according to survivorship rules. For example, a reliability score might be assigned to different data sources records (e.g., an ERP system might always be assumed to be more reliable than a customer relationship management (CRM) system). As another example, timeliness might indicate that more recent data is more reliable as compared to older data. Note that conflicts for different fields in source records might be resolved using different survivorship rules. For example, a "default" survivorship rule might indicate that the ERP system is more reliable than the CRM system and, in the event of a reliability tie; the most recent data is to be trusted more than older data.

In a mixed strategy situation, record-level survivorship rules may be applied first, and then field-level rules are applied. In some embodiments, a single record level consolidation rule is used, while multiple field level rules are applied in a given merge case. Survivorship rules consider pre-defined constraints that must be fulfilled. For example, a merged record address should not be empty, and if it turns out that the address is empty the group of duplicate records might not be merged and are instead put into an exception bucket for review by an operator.

In other cases, it may be possible to define rules that set value based on other field's values (e.g., if a gender field is empty and a title field equals "Mr.," then set the gender field of the resulting merged record to "Male"). That is, the master data program may enrich the merged record and create an improved record representation in creating the best record.

In some cases, however, duplicate records may need to be merged into a single physical record, but conflicting data values exist among the different records. For example, one record associated with an entity might indicate an address of "123 Main Street" while another record associated with the same entity indicates an address of "12 Main Street." A data steward can be presented with such discrepancies and take manual refinement actions to create the best record.

FIG. 1 represents a logical architecture according to some embodiments, and actual implementations may include more or different components arranged in other manners. Moreover, each system described herein may be implemented by any number of devices in communication via any number of other public and/or private networks. Two or more of devices of may be located remote from one another and may communicate with one another via any known manner of network(s) and/or a dedicated connection. Further, each device may comprise any number of hardware and/or software elements suitable to provide the functions described herein as well as any other functions. Other topologies may be used in conjunction with other embodiments.

Figure 2:
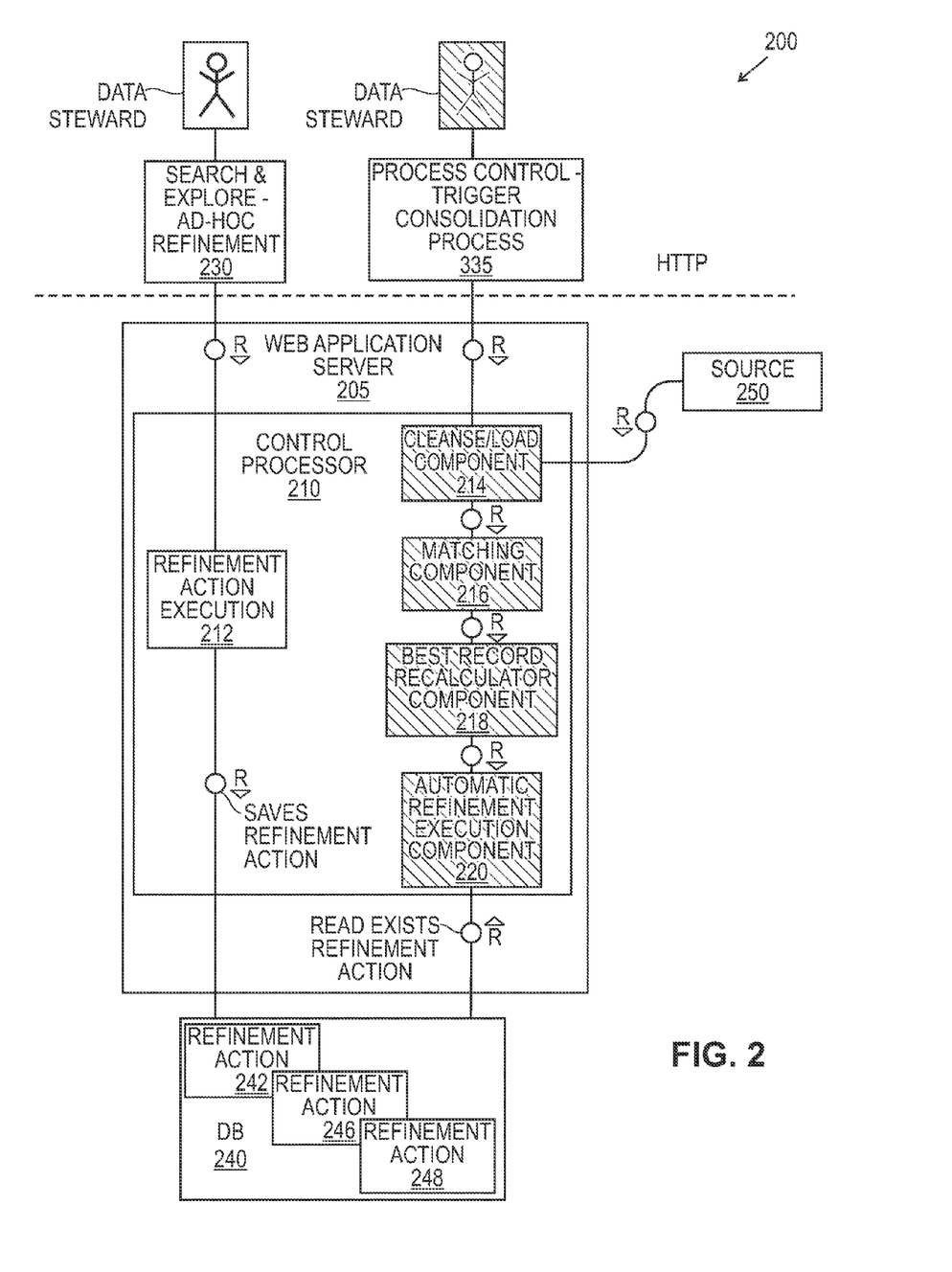
FIG. 2 depicts a system in accordance with some embodiments.

FIG. 2 depicts system 200 for providing an interactive user interface during data loads for master data management in accordance with an embodiment. System 200 can be implemented by web application server 205 that is under the control of processor 210. Web application server 205 can provide one or more user interfaces 230, 235 to a user (e.g., a data steward) via a communication protocol, such as HTTP, and others.

Control processor 205 can include refinement action execution component 212 that implements data steward definitions of new values to replace existing values of a field for selected best records. These data steward definitions can be stored in database 240 as refinement action rules 242, 246, 248. As described below, the stored refinement action rules are used to train heuristic algorithms that are implemented by one or more filters to correct data on subsequent data set loads.

A data steward can be presented with user interface 230 to review master records located in a consolidated data base, such as master data base 130. The data steward can identify and correct data discrepancies of a specific subset of best records while searching and exploring data in the best record table. These refinement actions of the data steward are monitored by an interactive dialog box as part of training/learning phase for data filters that implement heuristic algorithms.

Figure 3:
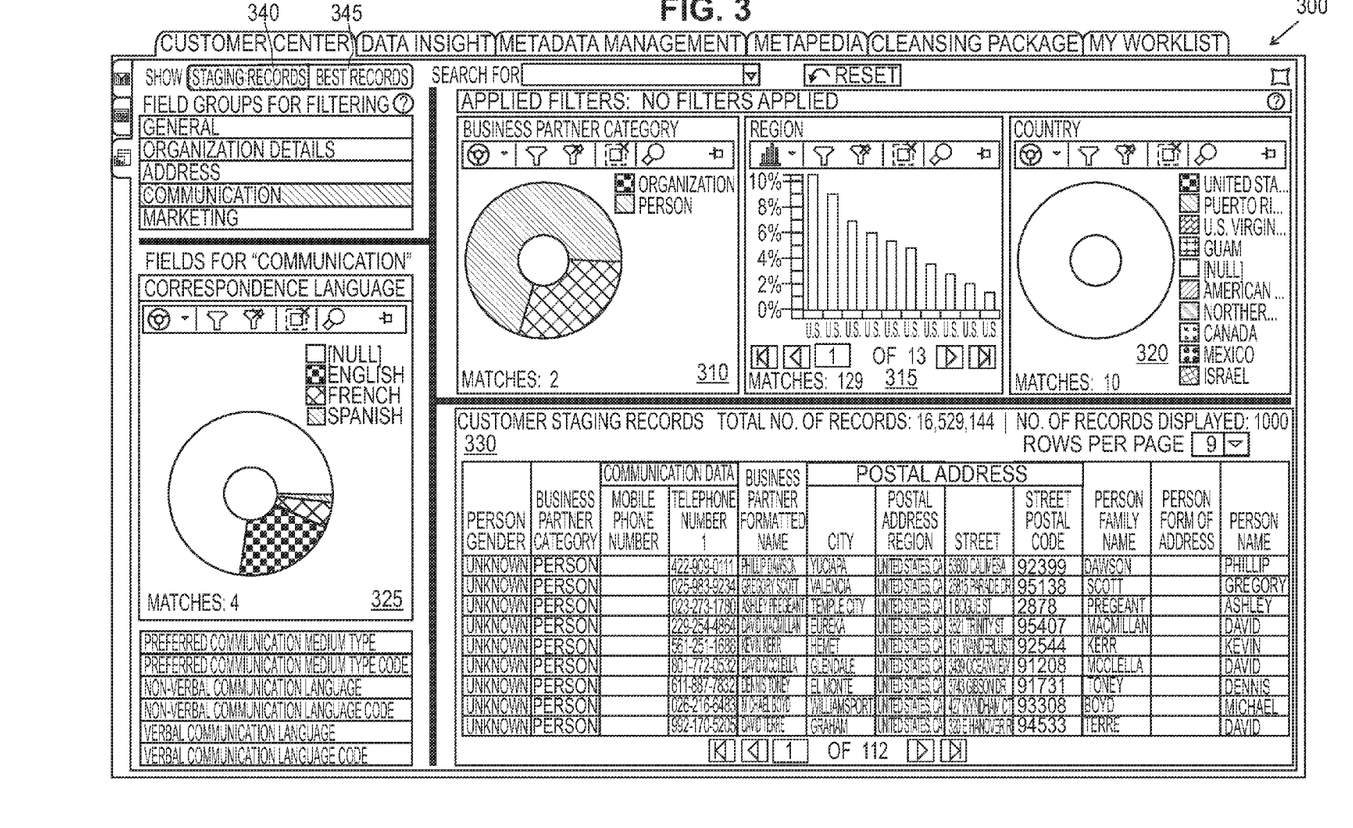
FIG. 3 depicts a user interface in accordance with some embodiments.

FIG. 3 depicts interactive user interface 300 in accordance with some embodiments. User interface 300 can provide one or more quality metric dashboards 310-330 that present data in graphical and tabular formats. The data presentation format can be preselected, or a user can select the format. Selection between tabs 340, 342 changes the source of the data used to calculate the dashboard metrics. Tab 340 selects staging records, which represent the data from individual sources (e.g., FIG. 1; data sources 110). These data sources can be associated with various ERP or CRM systems accessed by master data server 120. Tab 345 selects best records from master database 130 for the dashboard metric calculation. As described above, the best records can represent the result of consolidation and survivorship rules. However, discrepancies and/or duplications can still exist within the best records, and it is the refinement and elimination/reduction of these discrepancies that are addressed by the systems and methods described herein.

Figure 4:
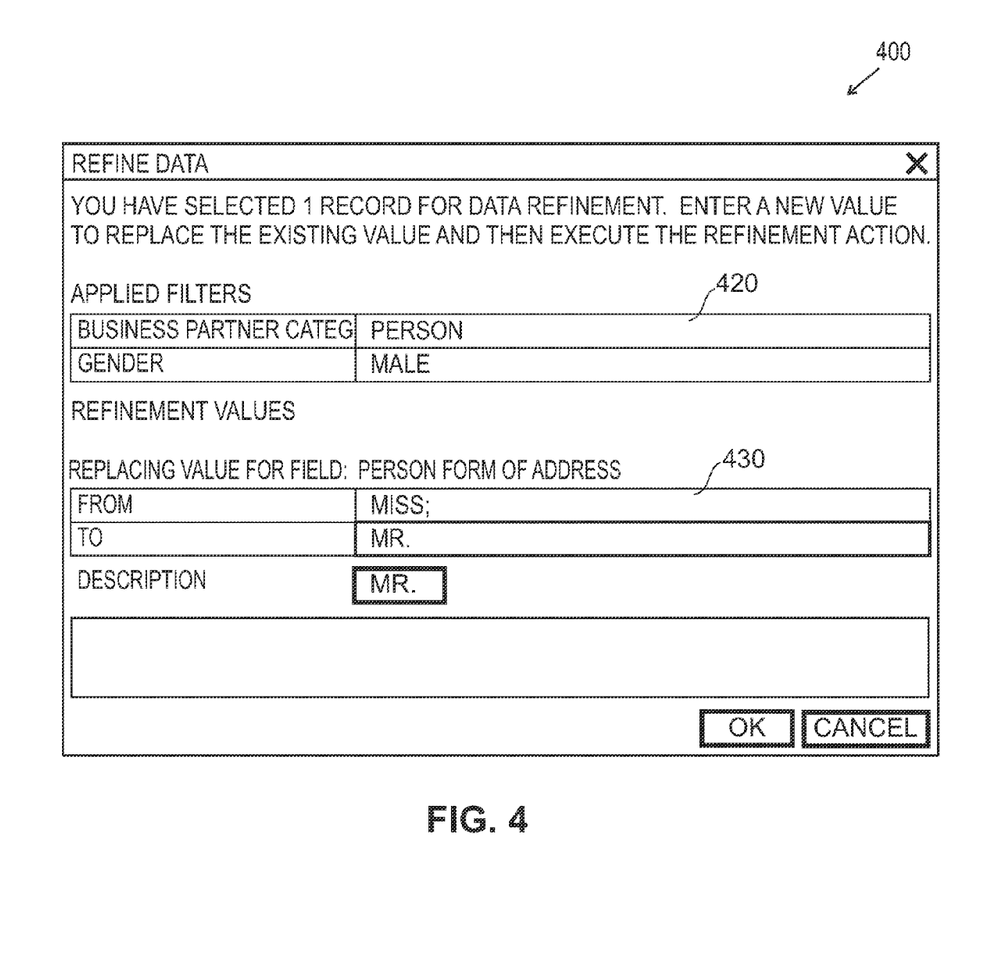
FIG. 4 depicts a user interface dialog box in accordance with some embodiments.

FIG. 4 depicts refinement dialog box 400 in accordance with some embodiments. The refinement dialog box can be presented to the user as the data steward corrects a discrepancy during the training/learning phase. Refinement dialog box 400 includes Applied Filters text box 420, where the user can specify filter parameters, including the particular filter algorithm that accesses the refinement action rule that results from the current dialog session. For example, the value "person" is shown for the business partner category filter, and a subcategory value of "male" has also been specified. Refinement Value text box 240 indicates the field value of "Miss" being replaced to the new value "Mr."

With reference to FIG. 2, during a subsequent load of data from the data sources to a MDM, system 200 can access refinement action rules 242, 246, 248. As described above, the refinement action rules reflect the data steward's prior interactions with data discrepancies and/or duplications from the data source(s). System 200, under control of control processor 210 implements corrections to address occurrences of the same, or similar, data quality issues.

In accordance with an embodiment, control processor 210 can include cleanse/load component 214, matching component 216, best record re-calculator component 218, and automatic refinement execution component 220.

A data steward can be presented with user interface 235. In one implementation the functionality of user interface 230 and user interface 235 can be combined, and the appropriate functionality presented to the user. The data steward can initiate a consolidation process. After master data server 120 consolidates data from data sources 110, the refinement process is conducted to eliminate (or reduce) data discrepancies before the data is made available to the business intelligence analytic tools.

Under direction of control processor 210, cleanse/load component 214 accesses data store 250 that contains the consolidated data set. The cleanse/load component transforms the ETL data load to prepare the data set so that the refinement process can achieve higher results. This preparation can include standardizing the data, validating the data set records and making corrections if needed, correcting and/or enriching postal code and other geographical information, standardizing names of entities (individual and business). After the data set is cleansed, the data can be loaded into the master database for refinement and removal of duplications and discrepancies in comparison to best records.

In one implementation, data store 250 can be master database 130 (described above). Matching component 216 compares the records within data store 250 for recent updates (delta records). If updated records are detected, best record re-calculator 218 determines the best record for each of the updated records. If the delta records contain the same data discrepancies which the data steward addressed during the learning phase, automatic refinement execution component 220 executes the refinement.

The automatic refinement execution component accesses the refinement action rule stored in database 240, and implements the heuristic algorithm associated with the filter indicated in text box 420 to change the value of the delta record to the value indicated in text box 430.

Figure 5A:
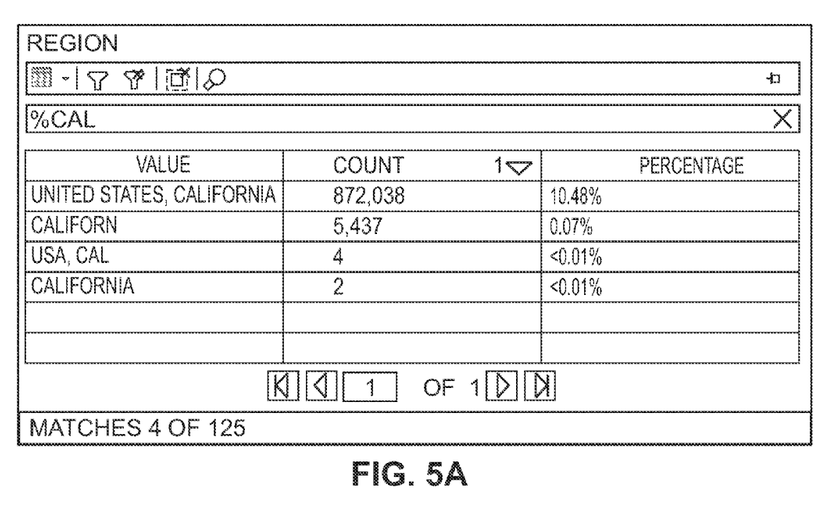
FIG. 5A depicts a search result graphical format in accordance with some embodiments.
Figure 5B:
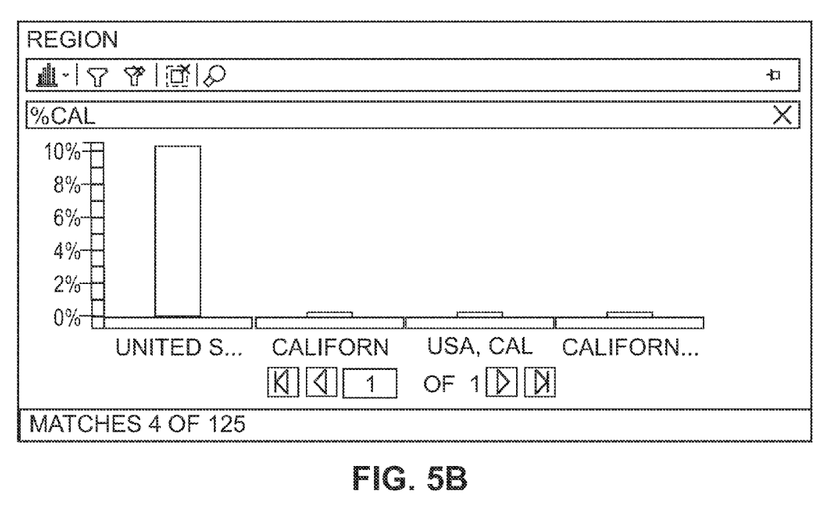
FIG. 5B depicts the search results of FIG. 5A in another graphical format in accordance with some embodiments.

In accordance with some embodiments, the data steward is aided by presentation of data field content using pie charts and stack bars, as depicted in FIG. 3. Filters implementing the heuristic algorithms are able to fuzzy search data records for a distinct set of values and detect issues. By way of example, FIG. 5A depicts, in tabular format, a search result for fields that contain geographical region data containing the string value "cal." This search locates those records with fields having different permutations for the state of California. FIG. 5B depicts the same data result in bar graph format, which is a better visual aid from which the data steward can recognize the records that could be corrected. In one interactive implementation, the data steward can highlight and click on the graphical (or tabular) data needing correction. Then, a dialog box can open, where applied filter text box 420, and refinement value text box 430 are tailored for the type and nature of the data highlighted by the data steward. The data steward enters information into the text boxes to correct the data during the ad hoc manual refinement. This manual action by the data steward is saved as a refinement action rule to later train heuristic algorithms to make the correction automatically during a subsequent data load.

Embodying systems and methods can be used to check for, and resolve, cross field inconsistencies—i.e., detecting inconsistent values in dependent columns and/or fields. The data steward can be confident about the quality of the title field, and based on the title the data steward can seek to refine and enrich information in dependent fields. By way of example, suppose a title field is "Person Form of Address," and the data steward selects the value "Mr." Under the gender field, data indicates that for records with the title "Mr." there are "male," "null" values. The data steward seeks to change the "null" values to "male."

Figure 6:
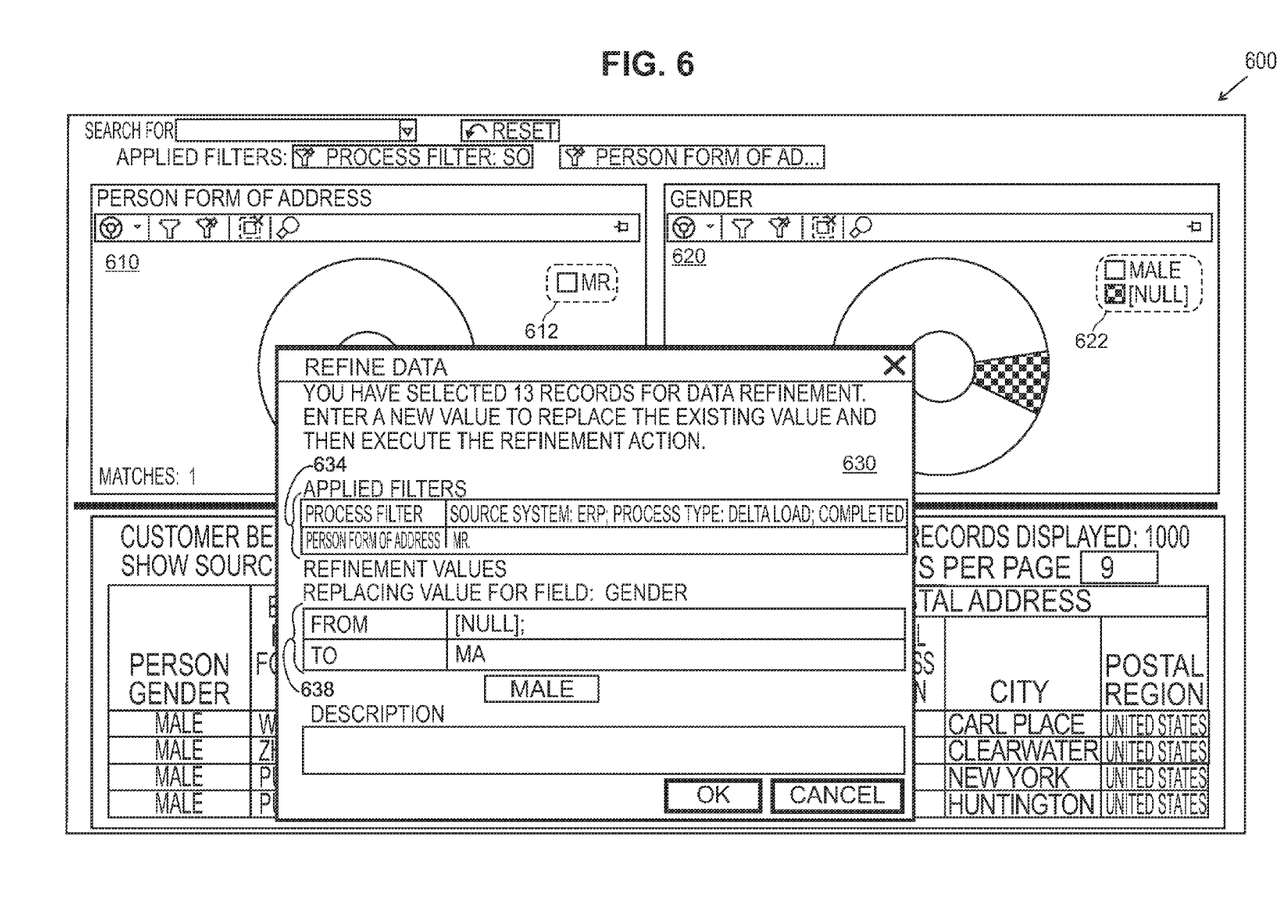
FIG. 6 depicts a user interface in accordance with some embodiments.

FIG. 6 depicts user interface 600 in accordance with some embodiments. User interface 600 includes graphical window 610, which indicates search results for the value "Mr." under the field "Person Form of Address." A pie chart key 612 indicates that "Mr." is the sole value selected. Graphical window 620 depicts the gender values for the records represented in window 610. Key 622 indicates that the pie chart has two values, "Mr." and "null." FIG. 6 also depicts refinement dialog box 630, where the user has entered selections for source system and details, along with the value "Mr." for Person Form of Address in the applied filters text box 634. In refinement value text box 638, the value "null" is selected to be replaced with the value "male," where an auto-complete suggestion appears after entry of the first few letters.

In accordance with some embodiments, systems and methods can apply pattern analysis of strings to refine data values and detect field format inconsistencies. This detection can be done using regular expression (Regex) comparison to match characters, words, or patterns of characters. The comparison results can show aggregates based on the number of occurrences of each format style detected. This aggregate information can be presented to the data steward for refinement—the data steward can change all occurrences to the format having the highest frequency of occurrence, or perhaps to a preferred format.

By way of example, phone number formats can vary widely (e.g., (nnn) nnn-nnnn, nnnnnnnnnn, nnn-nnn-nnnn, +nn(n)bnnnbnnnbnnnn, etc.). After selecting a record filed containing phone numbers, each of the various formats can be displayed along with the number of records having each of the formats. Using a refinement dialog box, as described above, the data steward can indicated the selected telephone format and propagate the change to all the selected record fields. A refinement action rule is stored in database 240, which can be accessed later for refinement of subsequent data loads by the filters implementing heuristic algorithms.

As described above, systems and methods in accordance with some embodiments save and reuse refinement actions by the data steward as refinement action rules for later use. The system can capture the interaction of the data steward with the system during a first data load, e.g. a cleansing case. These interactions are represented as one or more in a series of replace statements that are saved in a database along with the search criteria as refinement action rules. When subsequent data loads exhibiting the same, or similar, data quality issues, the refinement action rules can be applied automatically on the population that adhere to the search criteria in the refinement rule.

A BI user is accustomed to analyzing data in a hierarchal perspective. The data steward can refine the data load into the same hierarchies that can be available to the BI user in the MDM system to navigate and explore the data. Organizing the data during the data load will aid in maintaining the hierarchal parent-child relationships that the BI analytic tools are designed to apply. For example, a BI user might be accustomed to exploring sales data using the derived hierarchy of country→region→city. In accordance with some embodiments, systems and methods provide the data steward with the ability to explore the MDM load data from the same hierarchal perspective. Doing this exploration in a hierarchal perspective, the data steward can address data discrepancies relating to the dimension attribute of the data itself. These refinements can result in the BI user conducting analysis based on cleansed and trusted data.

Figure 7:
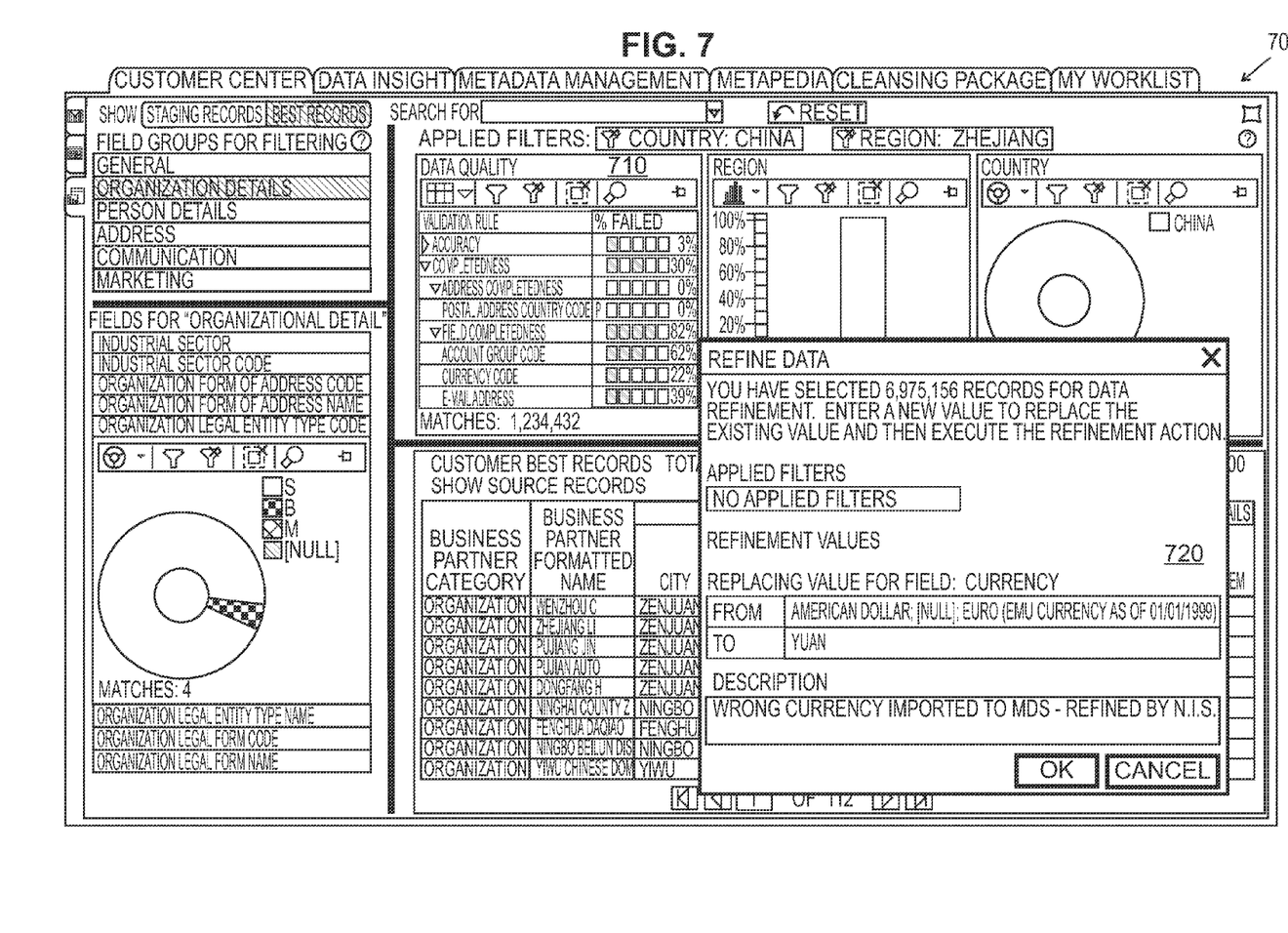
FIG. 7 depicts a user interface in accordance with some embodiments.

Embodying systems and methods can provide the data steward with the ability to discern records that violate business validation rules, and the ability to update the violating records to the correct value. FIG. 7 depicts user interface 700 in accordance with some embodiments. User interface 700 includes pane 710 that displays the result of a validation rule search. The data steward can define a data validation rule, for example to check for records without a currency code. As indicated in pane 710, filtering the data for country equal China, and region equal Zhejang, twenty-two percent of the records fail the currency code. Validation rules can be stored in database 240, and are used to check the effectiveness of the refinement rules. In the present example, the data steward can then implement a refinement dialog box 720, where the applied filter is set to customers from China's Zhejiang region, and the incorrect currency code of USD is to be replaced with Yuan.

In accordance with some embodiments, systems and methods can be used to detect statistical outliers among the data load. Outliers are defined as numeric values in any random data set that have an unusually high deviation from either the statistical mean (average) or the median value—e.g., the outliers are either relatively very small, or too large. Determining the outliers in a data set could be done by calculating the deviation for each number, expressed as either a Z-score or modified Z-score (standard deviation relative to the statistical average), and testing the data against certain predefined threshold(s). Modified Z-score applies the median computation technique to measure the deviation and in many cases provides more robust statistical detection of outliers. This statistical outlier detection can be used to highlight potentially incorrect and suspected values of reference data, like countries, regions, cities, etc.

Figure 8:
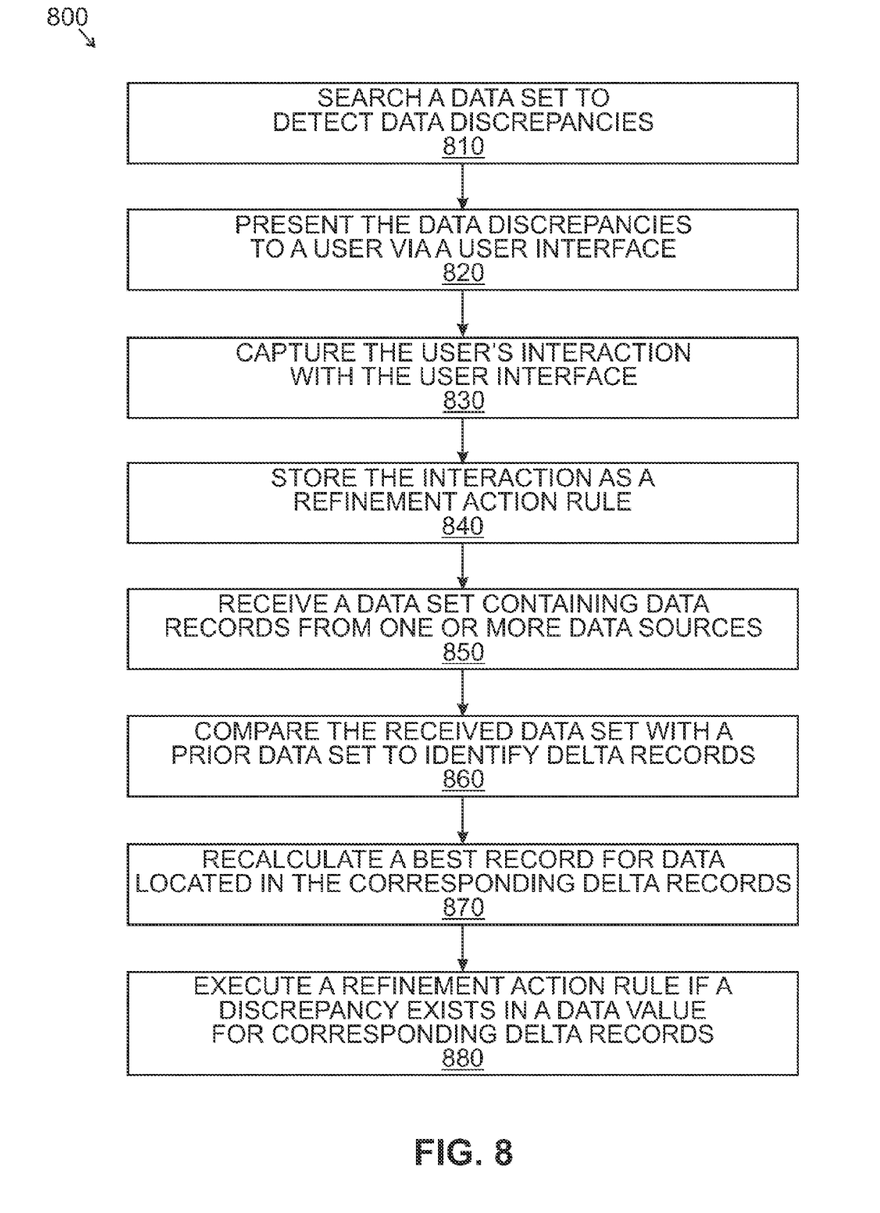
FIG. 8 depicts a process in accordance with some embodiments.

FIG. 8 depicts process 800 for refining data discrepancies in a data set in accordance with some embodiments. Process 800 can be used to automatically refine subsequent data loads from previously accessed data sources by implementing refinement action rules stored in a database. A web application server can implement a processor controlled search, step 810, of a data set to detect discrepancies. These discrepancies can be presented, step 820, to a user via an interactive user interface. The user (e.g., a data steward) can evaluate the discrepancies and refine the data values. As described above, a refinement dialog box can be presented to the user. The user enters applied filter parameters, which can include search criteria, into a text box and can enter the updated value in the refinement value text box. These user interactions are captured, step 830, and stored, step 840, as refinement action rules in a database coupled to the webserver processor.

When a subsequent load of data from data sources is received, step 850, a comparison of the received data set to a prior data set is performed, step 860, to identify delta records—e.g., data records that have been updated since the prior data set was loaded. A best record for the delta records is calculated, step 870. The recalculation is done for corresponding records between the data sets. If a discrepancy exists in a data value for corresponding data records, the processor can execute a refinement action rule, step 880, associated with the data value or record to correct the discrepancy.

In accordance with an embodiment of the invention, a computer program application stored in non-volatile memory or computer-readable medium (e.g., register memory, processor cache, RAM, ROM, hard drive, flash memory, CD ROM, magnetic media, etc.) may include code or executable instructions that when executed may instruct or cause a controller or processor to perform methods discussed herein such as a method for training and implementing heuristic filter algorithms to address data discrepancy and duplication in a master data management system in accordance with an embodiment.

The computer-readable medium may be a non-transitory computer-readable media including all forms and types of memory and all computer-readable media except for a transitory, propagating signal. In one implementation, the non-volatile memory or computer-readable medium may be external memory.

Although specific hardware and data configurations have been described herein, note that any number of other configurations may be provided in accordance with embodiments of the invention. Thus, while there have been shown, described, and pointed out fundamental novel features of the invention as applied to several embodiments, it will be understood that various omissions, substitutions, and changes in the form and details of the illustrated embodiments, and in their operation, may be made by those skilled in the art without departing from the spirit and scope of the invention. Substitutions of elements from one embodiment to another are also fully intended and contemplated. The invention is defined solely with regard to the claims appended hereto, and equivalents of the recitations therein.

The invention claimed is:

1. A computer-implemented method comprising:
receiving at a processor-controlled data store more than one data set, each data set containing respective data records from one or more respective data sources;
merging data of the respective data records into respective single records, each of the respective single records containing one or more data items from corresponding data records;
comparing data within the respective single records by a processor-implemented matching component to identify delta data within the respective single records;
calculating respective single best records for data located in each of the respective single records containing delta data by a processor-implemented best record recalculator component;
if a discrepancy exists in a data value among the respective single records, executing a refinement action rule by a processor-implemented refinement execution component; and
the refinement execution component implementing a heuristic algorithm associated with at least one filter configured to perform a fuzzy search of data records, the heuristic algorithm being trained by data steward definitions monitored by an interactive dialog box.

2. The method of claim 1, wherein the refinement action rule includes at least one replace statement and a search criteria.

3. The method of claim 1, further including the refinement execution component configured to change the data value of the discrepancy.

4. The method of claim 1, further including:
capturing an interaction by a user with the prior data set; and
storing the interaction in a data store as a refinement action rule.

5. The method of claim 1, further including:
performing a search of at least one data set to detect data discrepancies;
presenting in a user interface a graphical representation of the data discrepancies;
capturing an interaction by a user with the at least one data set; and storing the interaction in a data store as a refinement action rule.

6. The method of claim 1, further including:
applying string pattern analysis to the data records to identify data field format inconsistencies; displaying on a user interface a graphical representation of the aggregate of occurrences of the data field format inconsistencies;
capturing an interaction by a user with the graphical representation of the aggregate of occurrences; and
storing the interaction in a data store as a refinement action rule.

7. The method of claim 1, further including:
displaying on a user interface a graphical representation of the hierarchal perspective of at least one data set;
capturing an interaction by a user with the graphical representation of the hierarchal perspective; and
storing the interaction in a data store as a refinement action rule.

8. A non-transitory computer readable medium having stored thereon instructions which when executed by a processor cause the processor to perform the method of:
receiving more than one data set, each data set containing respective data records from one or more respective data sources;
merging data of the respective data records into respective single records, each of the respective single records containing one or more data items from corresponding data records;
comparing data within the respective single records to identify delta data within the respective single records;
calculating respective single best records for data located in each of the respective single records containing delta data;
if a discrepancy exists in a data value among the respective single records, executing a refinement action rule; and
the refinement action rule based on data steward definitions monitored by an interactive dialog box to train a heuristic algorithm associated with at least one filter configured to perform a fuzzy search of data records.

9. The computer readable medium of claim 8, the step of executing a refinement action rule includes causing the processor to perform at least one replace statement based on a search criteria included in the refinement action rule.

10. The computer readable medium of claim 8, further including executable instructions to cause a processor to perform the steps of:
capturing an interaction by a user with the prior data set; and
storing the interaction in a data store as a refinement action rule.

11. The computer readable medium of claim 8, further including executable instructions to cause a processor to perform the steps of:
performing a search of at least one data set to detect data discrepancies;
presenting in a user interface a graphical representation of the data discrepancies;
capturing an interaction by a user with the at least one data set; and
storing the interaction in a data store as a refinement action rule.

12. The computer readable medium of claim 8, further including executable instructions to cause a processor to perform the steps of:
applying string pattern analysis to the data records to identify data field format inconsistencies;
displaying on a user interface a graphical representation of the aggregate of occurrences of the data field format inconsistencies;
capturing an interaction by a user with the graphical representation of the aggregate of occurrences; and
storing the interaction in a data store as a refinement action rule.

13. The computer readable medium of claim 8, further including executable instructions to cause a processor to perform the steps of:
displaying on a user interface a graphical representation of the hierarchal perspective of at least one data set;
capturing an interaction by a user with the graphical representation of the hierarchal perspective; and
storing the interaction in a data store as a refinement action rule.

14. A system comprising:
a server under processor control configured to provide user interfaces to a user;
the processor configured to:
implement user interactions with the user interface to change data values in data records stored in a master database coupled to the server; and
store the user interactions as refinement action rules in a database coupled to the server;
the processor including:
a matching component configured to compare data within respective single records to identify delta data within the respective single records;
best record recalculator component configured to calculate respective single best records for data located in each of the respective single records containing delta data;
a refinement execution component configured to execute a refinement action rule if a discrepancy exists in a data value among the respective single records; and
the refinement execution component implementing a heuristic algorithm associated with at least one filter configured to perform a fuzzy search of data records, the heuristic algorithm being trained by data steward definitions monitored by an interactive dialog box.

15. The system of claim 14, wherein the refinement action rule includes at least one replace statement and a search criteria.

16. The system of claim 15, wherein the heuristic algorithms access the refinement action rule replace statement and the search criteria.

17. The system of claim 14, the server further configured to:
present a refinement dialog box on the user interface;
receive user entries in the refinement dialog box; and
store the user entries in the database as refinement action rules.

* * * * *